United States Patent [19]
Clark

[11] 4,104,949
[45] Aug. 8, 1978

[54] APPARATUS AND METHOD FOR TRANSCRIBING MUSICAL NOTATIONS

[76] Inventor: Timmy Clark, 5142 S. 1950 West, Roy, Utah 84067

[21] Appl. No.: 664,885

[22] Filed: Mar. 8, 1976

[51] Int. Cl.[2] ................................................ G01G 3/02
[52] U.S. Cl. ........................................ 84/462; 400/117
[58] Field of Search ................. 84/461, 462, 463, 470, 84/477, 478; 197/8

[56] References Cited

U.S. PATENT DOCUMENTS

| | | | |
|---|---|---|---|
| 1,847,282 | 3/1932 | Underwood | 84/461 |
| 2,805,596 | 9/1957 | Physioc | 84/461 |
| 3,395,461 | 8/1968 | Krause | 84/478 |
| 3,446,109 | 5/1969 | Scott et al. | 84/478 |

*Primary Examiner*—Lawrence R. Franklin
*Attorney, Agent, or Firm*—Criddle, Thorpe & Western

[57] ABSTRACT

A system for transcribing musical notations onto paper as corresponding notes are played on a piano includes a housing disposable on the piano above the keyboard to produce electrical signals representing the piano keys which are depressed, and a typewriter adapted to type musical notations representing notes onto paper rolled onto a cylindrical, rotatable platen of the typewriter. Also included is a type key actuating device disposable on the typewriter above the type keys and responsive to the electrical signals for depressing type keys corresponding to the musical notes represented by the signals. The type key actuating device includes a plurality of solenoids, each coupled to a different one of the type keys for depressing the key when energized by one of the signals.

1 Claim, 9 Drawing Figures

APPARATUS AND METHOD FOR TRANSCRIBING MUSICAL NOTATIONS

BACKGROUND OF THE INVENTION

This invention relates to apparatus for automatically transcribing musical notations onto paper as corresponding notes are played on a musical instrument or device such as a piano.

When composing a musical number, a composer typically plays portions of the number on a musical instrument until he is satisfied with a particular version of a portion and then interrupts his playing to write the notes on blank musical staffs. This process of playing and then interrupting the playing to write the notes continues throughout the entire composition effort. As might be expected, these constant interruptions disrupts the continuity of the composing process, making it more difficult to fully utilize the more creative moments. It is apparent that if the composer could devote his full time to playing different versions of the musical number being composed until he is satisfied, without continually interrupting his playing to write the notes, then the composition process would not only be carried out more rapidly but it might also result in a more consistent and accordant composition.

SUMMARY OF THE INVENTION

It is an object of the present invention to provide apparatus and method for automatically transcribing musical notations onto paper as corresponding notes are played on a musical instrument.

It is another object of the present invention to provide apparatus especially adapted for transcribing such musical notations when the corresponding notes are played on a conventional piano.

The above and other objects of the present invention are realized in an illustrative embodiment which includes a typewriter having a cylindrical, rotatable platen on which paper may be rolled, a plurality of type bars each bearing raised type representing a musical note and each actuable so that the type thereof strikes the platen at a different location therealong, and a plurality of type keys which, when depressed, actuate a corresponding one of the type bars, each type key representing a different musical note. Also included is a key actuating device mountable on the typewriter above the keys and responsive to signals representing musical notes for depressing the type keys corresponding to the musical notes represented by the received signals. Of course, since the type bars strike the platen at different locations, a plurality of the type keys may be depressed at the same time so that when a plurality of signals representing notes are received by the actuating device, a plurality of the corresponding type keys are operated to cause the inscription of musical notes onto paper rolled on the platen.

In accordance with one aspect of the invention, apparatus is provided for disposition on a piano above the piano keyboard for producing signals indicating which piano keys are depressed. The apparatus includes a plurality of feeler elements positioned in contact with the keys so that when a key is depressed, a corresponding feeler element detects this and causes the generation of an appropriate signal. The signals then cause the typewriter key actuating device to actuate the appropriate typewriter keys to type corresponding musical notes onto paper.

BRIEF DESCRIPTION OF THE DRAWINGS

The objects, features and advantages of the present invention will become apparent from a consideration of the following detailed description presented in connection with the accompanying drawings in which.

DETAILED DESCRIPTON

Figure 1:
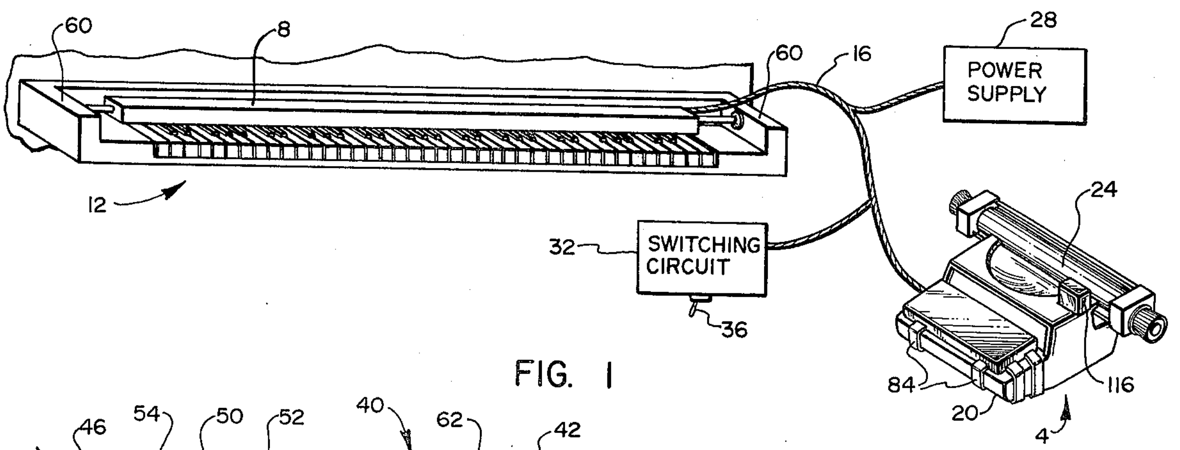
FIG. 1 shows a perspective view of apparatus made in accordance with the present invention for transcribing musical notations onto paper.

The basic components of the system of the present invention are shown in FIG. 1 to include a typewriter 4 adapted for typing musical notations on paper in response to signals from detection apparatus 8 mounted above a conventional piano keyboard 12. The detection apparatus 8 includes a plurality of feeler elements (to be described in more detail later) which maintain contact with the piano keys so that when the piano keys are depressed, the feeler elements move and thereby close switches to generate signals which identify the keys being depressed. The signals are transmitted via an electrical conductor 16 to the typewriter 4 and in particular to a typewriter key actuating device 20 mounted on the typewriter above the typewriter keys. The actuating device 20 responds to signals from the detection apparatus 8 by depressing the different keys on the typewriter causing the typewriter to type notations onto paper inserted on the typewriter roll or platen 24.

A power supply 28 provides power to the switches contained in the detection apparatus 8 to enable the switches to transmit electrical signals to the typewriter key actuating device 20. A switching circuit 32 allows for coupling certain of the leads from the switches of the detection apparatus 8 to either of two groups of leads of the typewriter key actuating device 20. The switching circuit 32 includes a conventional toggle switch 36 for placing the switching circuit 32 into either one of two conditions as will be described in more detail later.

Figure 2:
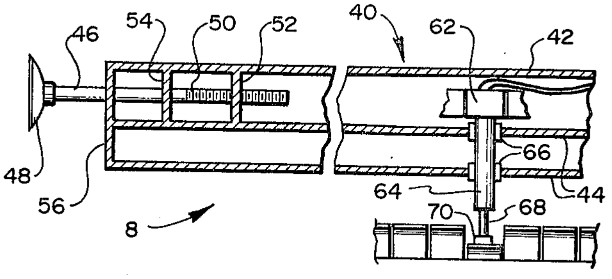
FIG. 2 is a front cross-sectional and fragmented view of the piano keyboard detection apparatus of FIG. 1.

The detection apparatus 8 is shown in greater detail in the fragmented, front cross-sectional view of FIG. 2. As there shown, the detection apparatus 8 includes an elongated housing 40 having a top wall 42 and a pair of spaced apart bottom walls 44. Front walls and rear walls may also be provided to completely enclose the switches and other elements of the apparatus. Extending from either end of the housing 40 through end walls 56 is a bracing arm or tension rod 46 on the outer end of which is mounted a cup-shaped pad 48 made of rubber or other suitably resilient material. The other end of the tension rod 46 is threaded as shown at 50 to be screwed through a threaded opening in an interior wall 52 which extends between the upper wall 42 of the housing and the nearest bottom wall 44 thereof. A second interior wall 54 located between the end wall 56 and the other interior wall 52 also includes an opening through which the tension rod 46 extends. This, of course, provides support for the tension rod. By rotating the tension rod 46, the rod may be adjusted into or out of the housing 40 so the detection apparatus 8 can be readily mounted to extend between piano keyboard end supports 60 (FIG. 1) typically located at either end of a piano keyboard. A similar bracing arm or tension rod is mounted in the other end of the housing 40 so that the horizontal disposition of the housing above a piano keyboard can be adjusted by appropriate adjustment of the tension rods. Frictional engagement of the piano supports 60 by the cup-shaped pads 48 function to maintain the detection apparatus 8 in position above the keyboard of the piano on which the apparatus was mounted.

Contained in the housing 40 is an array of switches, such as switch 62 (FIG. 2). Extending downwardly from each switch is a feeler element which includes a sleeve 64 positioned and held in place by a pair of resilient bushings 66 which, in turn, are positioned in openings in the bottom walls 44. The sleeve 64 extends downwardly from the switch 62 to a position below the bottom-most wall 44. A finger 68 is slidably disposed in the sleeve 64 to extend downwardly therefrom into contact with a corresponding one of the piano keys above which the detection apparatus 8 is positioned. A pad 70 is mounted on the end of the finger to prevent scratching the piano keys. Moving the finger 68 within the sleeve 64 causes the operation of the switch 62. That is, when the corresponding piano key is not depressed, it holds the finger 68 in a first position to maintain the switch 62 in a first condition (either open or closed). Then, when the piano key is depressed, the finger 68 moves downwardly with the key to thereby place the switch 62 in a second condition (either closed or open). Thus, each time the key is depressed, the switch 62 is operated to produce a signal which is transmitted via the conductor 16 (FIG. 1) to the typewriter key actuating device 20.

The switches 62 are conventional two-condition switches operable by the plunger-type action of the finger 68. Other switches are positioned in the housing 40 along the length thereof to detect depression of the other piano keys of the keyboard.

Figure 3A:
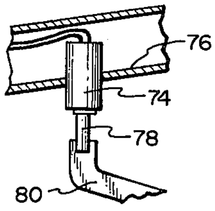
FIGS. 3A and 3B show respectively a side and front elevational view of a solenoid of the typewriter key actuating device of FIG. 1.
Figure 3B:
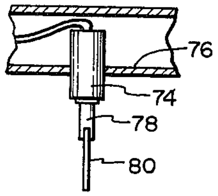

The signals transmitted by the switches 62 to the typewriter key actuating device 20 serve to operate solenoids such as the solenoid 74 in FIGS. 3A and 3B. As shown in FIGS. 3A, which is a side elevational view of the actuating device 20, the solenoid 74 is held in place by a support frame wall 76 disposed above the typewriter keys. The solenoid 74 is of a conventional type and includes a movable core rod 78 which is slidably disposed within the solenoid to move downwardly when the solenoid is activated. The end of the core rod 78 is forked, as best seen in FIG. 3B, to fit over the end of a type key 80. The type key 80 is conventional with the finger piece removed to allow coupling the core rod 78 to the end of the type key 80. When a signal is received by the solenoid 74, the core rod 78 is forced downwardly to thereby depress the corresponding type key 80 and cause a corresponding type bar to strike the typewriter platen 24.

The typewriter key actuating device 20 is fitted in place above the typewriter keys by brackets or straps 84.

Figure 4:
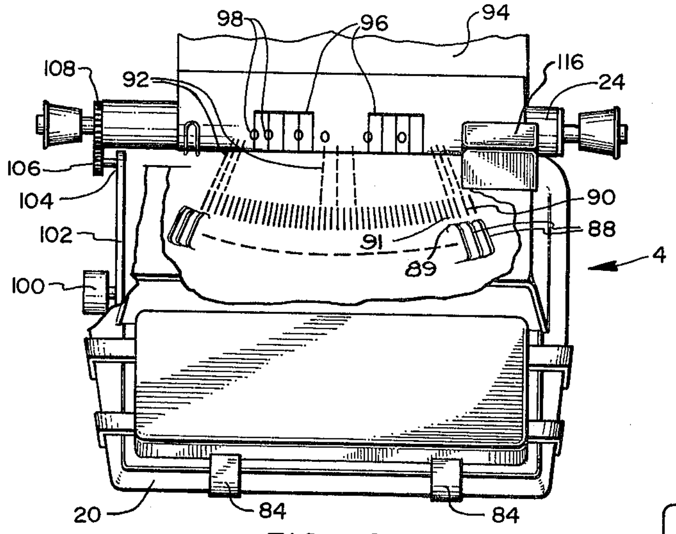
FIG. 4 shows a front elevational, partially cut away view of the typewriter of FIG. 1.

Referring to FIG. 4, there is shown a front, elevational view of the typewriter 4 of FIG. 1. The typewriter includes the conventional type bars 88 each of which, however, includes raised type representing a musical note (rather than letters, numbers, etc.). That is, each type bar 88 includes an O-shaped symbol representing a musical note. Provision for determining whether a typed note is a full note, half note, etc., will be described momentarily.

Another modification incorporated in the typewriter 4 of FIG. 4 is in the type bar guide and pivot support 90. In the standard typewriter, such type bar guide and support is adapted to cause each type bar to strike the platen at the same location (assuming that the platen remains stationary). In the typewriter of the present invention, the guide and pivot support 90 is adapted to guide the type bars so that they strike different locations on the platen 24 as indicated by the dotted lines 92. This can be accomplished very easily by simply providing a type bar guide and pivot support 90 having much less of a curvature than do the standard supports. With the type bar guide and support 90 of the typewriter 4, the type bars located at the ends of the support 90 strike locations on the platen 24 near the ends thereof, the type bars located near the center of the support strike locations on the platen 24 near the center thereof, etc. The platen 24 is adapted to rotate but not to move horizontally on the typewriter.

A piece of paper 94 is shown rolled onto the platen 24 in FIG. 4. The paper has inscribed thereon a pair of musical staffs 96 extending vertically on the paper so that as the platen is rolled, the staffs are exposed from one end toward the other end. Musical notes 98 are shown typed onto the staffs 96 in a generally horizontal line along the platen 24, but in a vertical line relative to the normal positioning of the staffs 96.

The notes of a chord, such as notes 98, are produced simultaneously when the corresponding type bars are actuated to strike the paper 94 by the type key actuating device 20. In other words a plurality of signals representing the notes to be typed are received by the actuating device 20 to activate corresponding solenoids which cause depression of the type keys to thereby actuate appropriate type bars. Of course, since the type bars 88 strike the platen 24 at different locations therealong, the type bars may be actuated at the same time, unlike a conventional typewriter.

Since each time a note or a chord is transcribed onto the paper 94, it is important that the paper 94 be moved some distance to make room for the next note or chord, provision is made for coupling the platen 24 to an electric motor 100 to cause the platen 24 to continuously rotate while the motor is operating. The motor is coupled by way of a belt 102 to a pulley 104 which, when rotated, causes a gear 106 to rotate. The gear 106, in turn, is coupled to a gear 108 located at the end of the platen 24 so that when the gear 108 is rotated, the platen 24 is also rotated. By providing for a continuous rotation of the platen 24 while the typewriter 4 is in operation, not only are the notes and chords spaced as they are typed onto the paper 94, but also the separation between the notes serves to indicate the length of the notes, i.e., whether the notes are full notes, half notes, quarter notes, etc. Thus, even though the raised type on the type bars 88 all contain the same musical note representation (for example an O-shaped symbol), the spacing between the notes and chords indicates whether the notes are full notes, half notes, etc. Of course, it is the spacing following a note or chord which indicates the length of the note. When the piano is played, as soon as the keys are struck, the detection apparatus 8 detects the depressed keys and causes the key actuating device 20 to actuate the type bars 88 to impress upon the paper 94 the notes corresponding to the keys played on the piano. If the keys played on the piano are held for a full note before the next chord or note is played, then the spacing between the notes inscribed on the paper 94 and the next notes to be inscribed will be of a length representing a full note. An alternative arrangement for indicating the length of the notes will be described later.

Figure 5:
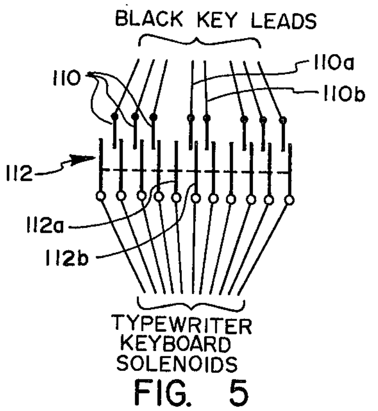
FIG. 5 is a schematic of the switching circuit of FIG. 1.

In order to indicate whether sharps or flats are being played, a switching circuit 32 (FIG. 1) is provided. All of the switches 62 for detecting depression of the black keys are coupled to the switching circuit 32 as indicated generally in FIG. 5. As there shown, the black key leads from the detection apparatus 8 are coupled to terminals 110 in the switching circuit 32. Also included in the switching circuit 32 is a ganged series of terminals 112 which are coupled to various solenoids 74 of the key actuating device 20. These ganged terminals 112 may be positioned in either of two positions. In one position the terminals 112 are moved to the left and in the other the terminals are moved to the right to correspondingly contact the stationary terminals 110. When the ganged terminals 112 are in one of the two positions, depressing the black key on the piano keyboard will cause corresponding type bars 88 to type notes with a dot beside the notes. The dot beside the notes is made red (or some other color) to indicate a sharp by positioning the type ribbon so that a red-inked portion thereof is struck by dots on the type bars in question. The positioning of the type ribbon would be done prior to starting the playing of the piece to be transcribed. When the ganged terminals 112 are in the other of the two positions, then depressing the black keys will cause different corresponding type bars 88 to type notes also with a dot therebeside. The dot is made black to indicate a flat and this is done simply by prepositioning the type ribbon. A type bar is shown in FIG. 4 with raised type 89 representing a note, and raised type 91 representing a dot.

To better understand the provision for sharps and flats, assume that stationary terminal **110*a* is coupled to the switch and feeler element which is in contact with the black key located between the white keys representing middle C and D on the piano keyboard and that stationary terminal 110*b* is coupled to the switch and feeler element in contact with the black key between white keys D and E on the piano keyboard. Then, for a particular musical number having sharps, the ganged terminals 112 are moved to the right so that movable terminal 112*a* contacts stationary terminal 110*a* and the type ribbon is positioned in the conventional manner so that a red dot will be typed beside each note which is "sharped". Then, when the black key between middle C and D is depressed, a signal is transmitted from the detection apparatus 8 via the switching circuit 32 (FIG. 1) to the typewriter key actuating device 20 to cause it to type a note representing middle C, but with a red dot beside the note. Similarly, if a musical number is to contain flats, then the ganged terminals 112 are moved to the left so that movable terminal 112*b* contacts stationary terminal 110*a* and the type ribbon is positioned so that a black dot will be impressed beside the "flatted" notes. Then, when the black key between middle C and D is depressed, a signal is transmitted from the detecting apparatus 8 via the switching circuit 32 to the typewriter key actuating device 20** to type the note D with a black dot by the note.

With the use of the switching circuit 32, the type bar guide and pivot support 90 is adapted so that each possible note location on the staffs 96 may be struck by either of two different type bars. Thus, the middle C location on the staffs 96 may be struck by a type bar having raised type representing a musical note with a dot therebeside (for a sharp or flat) or by a type bar having raised type representing a musical note having no dot therebeside. The same is true for all other locations on the staffs 96. This, of course, will cause no problem since each transcribed note will either be flatted, sharped or neither so that only one type bar in each group of two will be actuated at any given time. By using a common sign (dot) for sharps and flats, differentiated only by color, a single type bar can be used for both a "sharped" or "flatted" note.

Figure 6B:
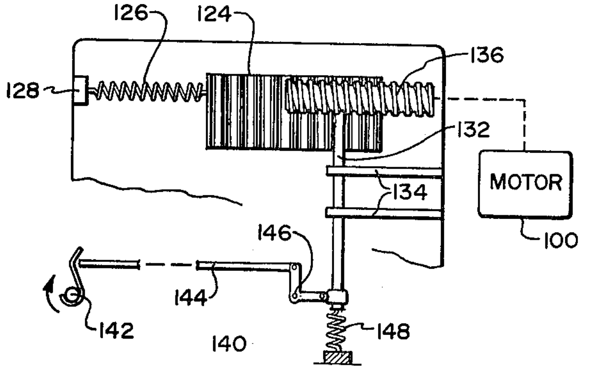
FIGS. 6A and 6B respectively show a top plan view and a front elevational view of one alternative embodiment of timing apparatus suitable for use in the present invention.
Figure 6A:
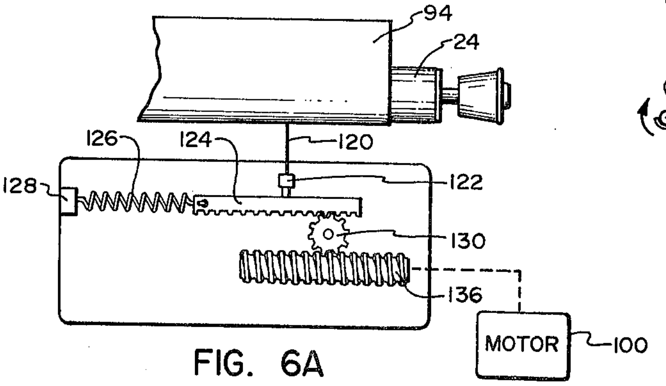

FIGS. 6A and 6B show an alternative apparatus for indicating the duration of the notes. This apparatus could advantageously be included in housing 116 shown in FIG. 4. The apparatus includes an ink dispensing tube 120 and an ink cartridge 122 for holding ink. The cartridge 122 delivers ink to the tube 120 for deposit on a paper 94 rolled onto the platen 24. The ink cartridge 122 is coupled to a rack gear 124 which is mounted to move along a line generally parallel with the platen 24. One end of the gear 124 is coupled to a coil spring 126 which in turn is coupled to a stationary mount 128. The spring 126 functions to apply a force leftwardly of the gear 124 to tend to prevent movement of the gear to the right. The gear 124 is caused to move to the right by a gear 130 which is secured to a shaft 132 held in place by brackets 134. A worm gear 136 is coupled to the electric motor 100 by a linkage indicated by dotted line in the drawings so that the worm gear 136 continuously rotates and as it rotates it causes the gear 130 to turn (in the clockwise direction when viewing FIG. 6A) to thereby cause the rack gear 124 to move to the right. The rack gear 124 thus carries the cartridge 122 and ink tube 120 across the paper 94 to leave a trace such as trace 150 shown in FIG. 6C. Of course, the rack gear 124 will continue to move to the right until it is either disengaged from the gear 130 or until the gear 130 is disengaged from the worm gear 136. If the gear 130 is disengaged from the worm gear 136, the spring 126 draws the gear 124 back to the left to a starting position.

Figure 6C:
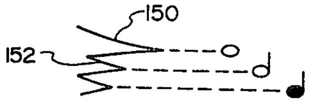
FIG. 6C shows timing traces made by the timing apparatus of FIGS. 6A and 6B.

The apparatus of FIGS. 6A and 6B is used to indicate the length of the notes by coupling the shaft 132 of the gear 130 to a universal bar linkage 140 so that the shaft 132 is drawn downwardly (FIGS. 6B) each time the universal bar 142 of the typewriter is operated. Thus, when a chord or note is played on the piano keyboard and then transcribed onto the paper in the typewriter, the solenoids of the typewriter key actuating device 20 engage and depress the type keys. Operation of the type keys cause the universal bar 142 to rotate (clockwise in FIG. 6B) and this, in turn, forces forward a bar 144 of the universal bar linkage 140. The universal bar linkage 140 is thus caused to pivot about pivot point 146 thereby causing the gear 130 to be pulled downwardly to disengage from the worm gear 136 and allow the rack gear to return to the left. (The gear 130 stays in engagement with the rack gear 124 but since gear 130 is freely rotatable, it does not retard return of the rack gear.) After the rack gear 124 is returned to its starting position, the universal bar linkage 140 is released to allow a spring 148 to force the rod 132 and gear 130 upwardly to again engage the worm gear 136. In this manner, traces such as shown in FIG. 6C are produced on the paper *after* a note is typed to indicate the length of the note. That is, the note is typed causing return of the rack gear 124 and then the trace begins. The trace continues until the next note is typed and so the length of the trace indicates the length of the previously typed note.

Trace 150 of FIG. 6C is the longest trace and, of course, represents a full note, trace 152 is one-half the length of trace 150 and therefore represents a half note, etc. as shown.

For the arrangement of composite FIG. 6, rotation of the platen 24 could be keyed to operation of the universal bar in a manner similar to that of the operation of the gear 130 so that each time a typewriter key were actuated, the universal bar would cause the platen to rotate one portion of a turn. Alternatively, the platen could simply be allowed to continuously rotate as previously described.

It is to be understood that the above-described arrangement in only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is:

1. A system for transcribing musical notations onto paper as the corresponding notes are played on a piano, organ, or the like, said system comprising first means disposable on the piano above the keyboard for producing indications of the keys depressed, such indications thereby representing musical notes corresponding to the depressed keys, typewriter means comprising a cylindrical, rotatable platen on which paper is rolled, a plurality of type bars each bearing raised type representing a musical note and each actuable so that the type thereof strikes the platen at a different location thereof, a plurality of type keys which, when depressed, actuate a corresponding one of said type bars, each type key representing a different musical note, an electric motor, and a universal bar disposed to be contacted and moved from a first position to a second position by the type keys when the type keys are depressed, second means disposable on said typewriter means above the keys thereof and responsive to said indications for depressing type keys corresponding to the musical notes represented by the indications, marking means disposed adjacent the cylindrical platen and movable longitudinally along the platen to mark paper rolled onto the platen, means coupled to said electric motor for causing said marking means to move from a fixed position adjacent the platen in one direction longitudinally along the platen, and means coupled to the universal bar for causing the marking means to return to said fixed position when the universal bar moves from the first position to the second position.

* * * * *